US008452050B2

United States Patent
Golan et al.

(10) Patent No.: US 8,452,050 B2
(45) Date of Patent: May 28, 2013

(54) SYSTEM AND METHOD FOR COUNTING PEOPLE NEAR EXTERNAL WINDOWED DOORS

(75) Inventors: Oren Golan, Or-Yehuda (IL); Arie Pikaz, Givatayim (IL); Jeffrey Sanders Raj, Farmington, NY (US)

(73) Assignee: Lenel Systems International, Inc., Pittsford, NY (US)

( * ) Notice: Subject to any disclaimer, the term of this patent is extended or adjusted under 35 U.S.C. 154(b) by 0 days.

(21) Appl. No.: 13/517,692

(22) Filed: Jun. 14, 2012

(65) Prior Publication Data

US 2012/0249790 A1    Oct. 4, 2012

Related U.S. Application Data

(62) Division of application No. 12/086,064, filed as application No. PCT/US2006/046805 on Dec. 8, 2006, now Pat. No. 8,224,026.

(60) Provisional application No. 60/748,539, filed on Dec. 8, 2005.

(51) Int. Cl.
    *G06K 9/00*    (2006.01)
(52) U.S. Cl.
    USPC ......................................................... 382/103
(58) Field of Classification Search
    USPC .................... 382/100–107; 348/113–117;
                                    375/240.03–240.29
    See application file for complete search history.

(56) References Cited

U.S. PATENT DOCUMENTS

| | | | |
|---|---|---|---|
| 4,000,400 A | 12/1976 | Elder | |
| 4,122,331 A | 10/1978 | Tsubota et al. | |
| 4,278,878 A | 7/1981 | Kato | |
| 4,303,851 A | 12/1981 | Mottier | |
| 4,799,243 A | 1/1989 | Zepke | |
| 5,187,688 A | 2/1993 | Saruta | |
| 5,465,115 A | 11/1995 | Conrad et al. | |
| 5,656,801 A | 8/1997 | Goren et al. | |
| 5,850,082 A | 12/1998 | Eaton et al. | |
| 6,233,588 B1 | 5/2001 | Marchoili et al. | |
| 6,327,547 B1 | 12/2001 | Shapira | |
| 6,712,269 B1 | 3/2004 | Watkins | |
| 6,738,772 B2 | 5/2004 | Regelski et al. | |
| 7,516,888 B1 | 4/2009 | Kundu et al. | |
| 2004/0141633 A1 | 7/2004 | Horie | |
| 2004/0240542 A1 | 12/2004 | Yeredor et al. | |
| 2005/0093697 A1 | 5/2005 | Nichani et al. | |
| 2005/0117804 A1 | 6/2005 | Ida et al. | |
| 2006/0269103 A1* | 11/2006 | Brown et al. | 382/103 |

OTHER PUBLICATIONS

Lenel OnGuard(R) 2005 Second Edition, Product Introduction Brochure, pp. 1 and 2.
Gonzalez, Rafael C., et al., Digital Image Processing, Addison-Wesley Publishing Co., Massachusetts, Chapter 8.4.2, p. 518, 1993.
Lenel Systems International, Inc., Lenel IntelligentVideo for OnGuard VideoManager, 2005.

* cited by examiner

*Primary Examiner* — Atiba O Fitzpatrick
(74) *Attorney, Agent, or Firm* — Carlson, Gaskey & Olds PC (57) ABSTRACT

A system for counting objects, such as people, crossing an area includes a camera configured for capturing video images along a surface in the area. The surface includes a plurality of detectable features on the surface. A user interface allows an individual to define a region where object detection is desired. A processor processes the images and counts a detected object in the region when criteria for counting are satisfied.

9 Claims, 8 Drawing Sheets

SYSTEM AND METHOD FOR COUNTING PEOPLE NEAR EXTERNAL WINDOWED DOORS

This application is a divisional of U.S. patent application Ser. No. 12/086,064 filed Dec. 7, 2009 now U.S. Pat. No. 8,224,026, which is the national stage application of International Application No. PCT/US2006/046805 filed Dec. 8, 2006, which claims priority to U.S. Provisional Patent Application No. 60/748,539, filed Dec. 8, 2005.

FIELD OF THE INVENTION

The present invention relates to a system and method for counting people, and relates particularly to a system and method for counting people or other moving object in images captured by a video camera adjacent an external windowed door. The invention is especially useful for reducing counting error by determining presence of an person along the image place of a video camera which is unaffected by movement of spurious light. Such spurious light often occurs when ambient light is deflected from door surfaces as the door opens or closes.

BACKGROUND OF THE INVENTION

Devices using various types of sensors for counting people passing an area have been developed, such as described for example in U.S. Pat. Nos. 4,278,878, 5,187,688, 6,327,547, 4,303,851, 5,656,801, 4,799,243, and 6,712,269. However, such have not been incorporated using video surveillance type cameras such as often used in facility protection systems for building(s) near entrances/exits of such building(s) having doors. In situation of external windowed doors, with direct light on the surface under the camera, opening of the doors and entering people might cause dynamic blobs of lights that can confuse the counting. Ambient light is often the cause for such blobs of light which may deflect from swinging door surfaces, but can also be cause in some situations by artificial light sources; such as automobile lights, lamps, or high luminescent luminaries often present in parking lots. Thus, a counting system using a camera that can efficiently count people without being negatively effected by such dynamic light is desirable.

SUMMARY OF THE INVENTION

It is a feature of the present invention to provide a system and method for counting people in video images which can discriminate between objects representing spurious light crossing an image plane and objects, such as people, crossing the image plane.

Briefly described, the present invention embodies a system having a camera for capturing video images along an image plane in which two-dimensional shapes or design are spaced along the image plane, and a computer system for receiving the images and detecting objects associated with change occurring in the images, and counting one of the detected objects at least in accordance with one of the detected objects which approximates a shape associated with the object being counted (e.g., ellipse to count a person) that fully or substantially blocks a portion of the two-dimensional shapes or design in the image associated with the detected object, thereby discriminating between real objects and spurious light along the image plane.

In the preferred embodiment, computer system counts a detected object when such detected object not only approximates a shape associated with the object being counted that fully or substantially blocks a portion of the two-dimensional shapes or design in the image associated with the detected object, but that the detected object has one or more characteristic associated with the desired object to be counted. Such characteristics may represent shape properties, such as a sufficient size associated with the object to be counted, or whether the change associated with the detected object is sufficiently compact to represent an object to be counted, or other shape based criteria. The computer system may further be capable of detecting the direction of each detected object, and detected object may be counted is in accordance with its detected direction.

The present invention also embodies a method for comprising the steps of: capturing images along an image plane in which objects to be counted cross over the image plane; providing two-dimensional shapes or design spaced along an image plane; detecting one or more objects in one of the captured images associated with change along the image plane in accordance with one of a previously one of the captured images or a background image; determining whether each of the one or more detected objects represents a real object when the detected object approximates a shape associated with the object to be counted that at least substantially blocks a portion of the two-dimensional shapes or design in the captured image in which the object was detected, and counting the real object in accordance with one or more characteristics of the detected object associated with the real object, such characteristics may represent shape properties as size or the compactness of change detected within the detected real object.

The method may further provide for determining the direction of movement of each of the one or more detected objects crossing the image plane, and counting the real object is in accordance with the determined direction of movement of the detected object associated with the real object.

The present invention further embodies a user interface for counting objects, such as people, in images captured by a video camera having at least one window capable of displaying video image data captured by the camera, in which the user in at least one of the displayed images defines a region along which objects crossing are to be counted, and a direction of crossing by objects through the region. The user interface may further output the number of counted objects crossing the region in that direction.

The term objects with respect to counting referring to moving objects along a region of the image plane in captured images. Although the description below describes such objects as people, they may represent other objects by using the desired shape of the object in approximating detected objects to be counted and other criteria associated with one or more characteristics of the object (e.g., shape properties of size or compactness, or other shape properties, such as orientation or elongation). Thus, other geometric shapes than ellipses may be used to approximate detected objects.

BRIEF DESCRIPTION OF THE DRAWINGS

The foregoing features and advantages of the invention will become more apparent from a reading of the following description in connection with the accompanying drawings, in which.

DETAILED DESCRIPTION OF INVENTION

Figure 1A:
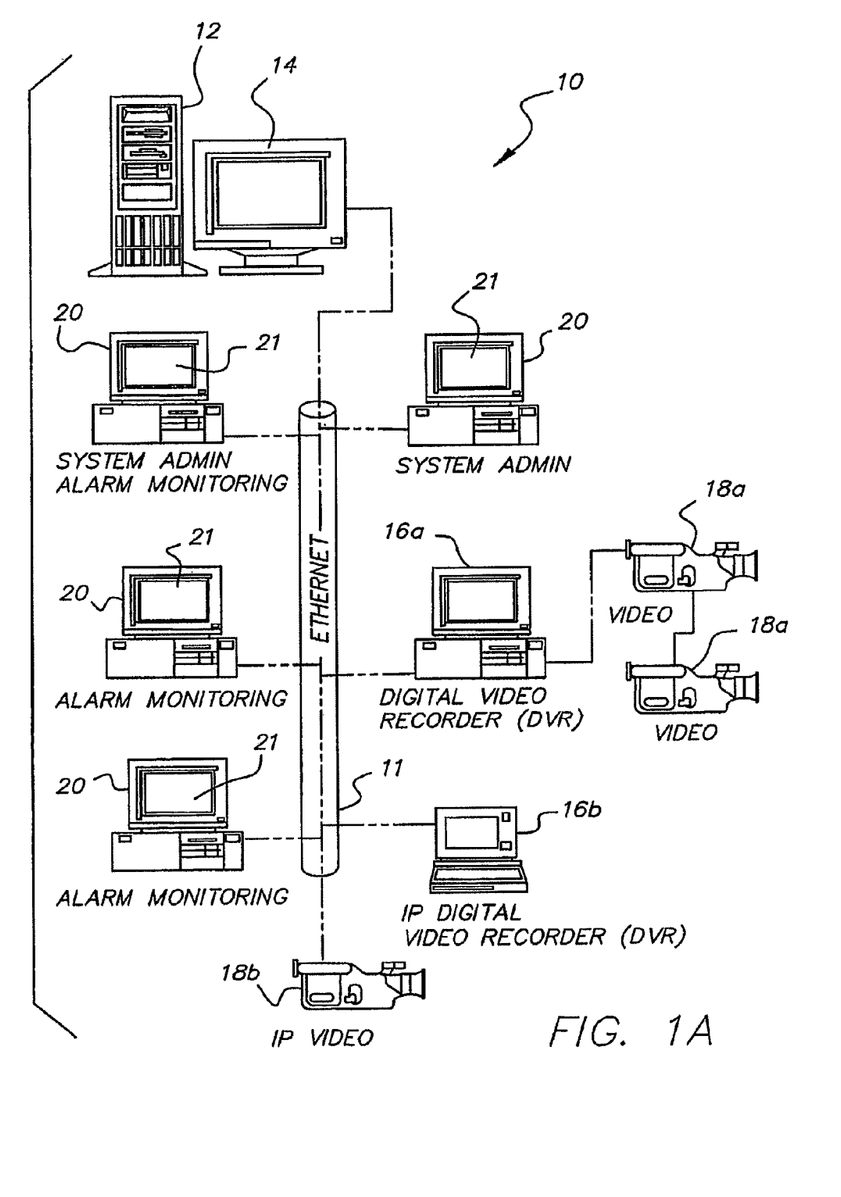
FIG. 1A is a block diagram of a network connecting computer systems to video cameras via their associated digital recorders.

Referring to FIG. 1A, a system 10 is shown is shown having a computer system or server 12 for receiving video image data from one or more digital video recorders 16a and 16b via a network (LAN) 11. The digital video recorders 16a and 16b are each coupled to one or more video cameras 18a and 18b, respectively, for receiving and storing images from such cameras, and transmitting digital video data representative of captured images from their respective cameras to the computer server 12 (or to one or more computer workstations 20) for processing of video data and/or outputting such video data to a display 14 coupled to the computer server (or a display 21 coupled to workstations 20). One or more computer workstations 20 may be provided for performing system administration and/or alarm monitoring. The number of computer workstations 20 may be different than those shown in FIG. 1. The workstations 20, server 12, digital video recorders 16a and 16b, communicate via network 11, such by Ethernet hardware and software, for enabling LAN communication.

The digital video recorders may be of one of two types, a digital video recorder 16a for analog-based cameras, or an IP network digital video recorder 16b for digital-based cameras. Each digital video recorder 16a connects to one or more analog video cameras 18a for receiving input analog video signals from such cameras, and converting the received analog video signals into a digital format for recording on the digital storage medium of digital video recorders 16a for storage and playback. Each IP network digital video recorder 16b connects to IP based video camera 18b through network 11, such that the cameras produces a digital data stream which is captured and recorded within the digital storage medium of the digital video recorder 16b for storage and playback. The digital storage medium of each digital video recorders 16a and 16b can be either local storage memory internal to the digital video recorder (such as a hard disk drive) and/or memory connected to the digital video recorder (such as an external hard disk drive, Read/Write DVD, or other optical disk). Optionally, the memory storage medium of the digital video recorder can be SAN or NAS storage that is part of the system infrastructure.

Typically, each digital video recorder 16a is in proximity to its associated cameras 18a, such that cables from the cameras connect to inputs of the digital video recorder, however each digital video recorders 16b does not require to be in such proximity as the digital based cameras 18b connect over network 11 which lies installed in the building(s) of the site in which the video surveillance system in installed. For purposes of illustration, a single digital video recorders of each type 16a and 16b is shown with one or two cameras shown coupled to the respective digital video recorder, however one or more digital video recorders of the same or different type may be present. For example, digital video recorders 16a may represent a Lenel Digital Recorder available from Lenel Systems International, Inc., or a M-Series Digital Video Recorder sold by Loronix of Durango, Colo., digital video recorder 16b may represent a LNL Network Recorder available from Lenel Systems International, Inc., and utilize typical techniques for video data compression and storage. However, other digital video recorders capable of operating over network 11 may be used. Also, camera 18b may send image data to one of the computer 12 or 20 for processing and/or display without use of a digital video recorder 16b, if desired.

Video cameras 18a and 18b are installed in or around areas of buildings, or outside buildings, or remote location to view areas. Groups of one or more of the video cameras 18a and 18b are each coupled for data communication with their respective digital video recorder.

The system 10 may be part of a facilities security system for enabling access control in which the network 11 is coupled to access control equipment, such as access controllers, alarm panels, and readers, and badging workstation(s) provided for issuing and managing badges. For example, such access control system is described in U.S. Pat. Nos. 6,738,772 and 6,233,588.

Figure 1B:
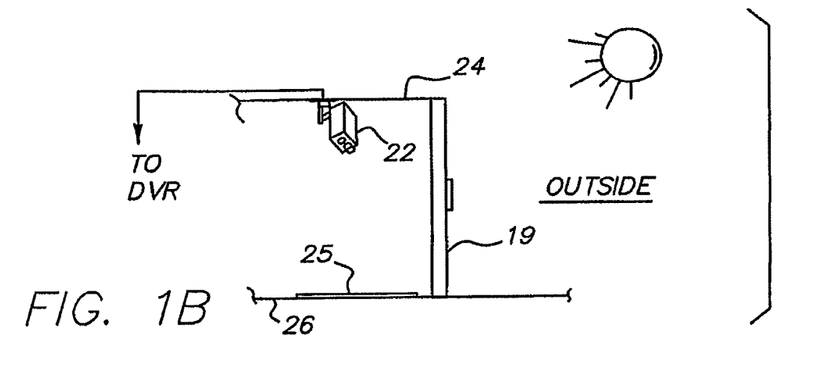
FIG. 1B is a block diagram of one of the video cameras of the network of FIG. 1A which is mounted for imaging the floor and provides images, via its associated digital video recorder to one of the computer systems of FIG. 1A for enabling counting in accordance with the present invention.

Referring to FIG. 1B, a video camera 22 represents one of the video cameras 18a or 18b of FIG. 1A. Camera 22 is mounted overhead to the ceiling 24 near a door 19 where counting of people is desired who pass through the door (gate or passage) 19, which may having window(s) or other surface (s), such as metallic surfaces, capable of reflecting light. The camera 22 provides images, via its associated DVR 16a or 16b (or directly without a DVR), to one of the computers 14 and 22 which has software (or program) for counting in accordance with such images received, as described later below. Such computer enabling counting may be considered a computer server.

Figure 2:
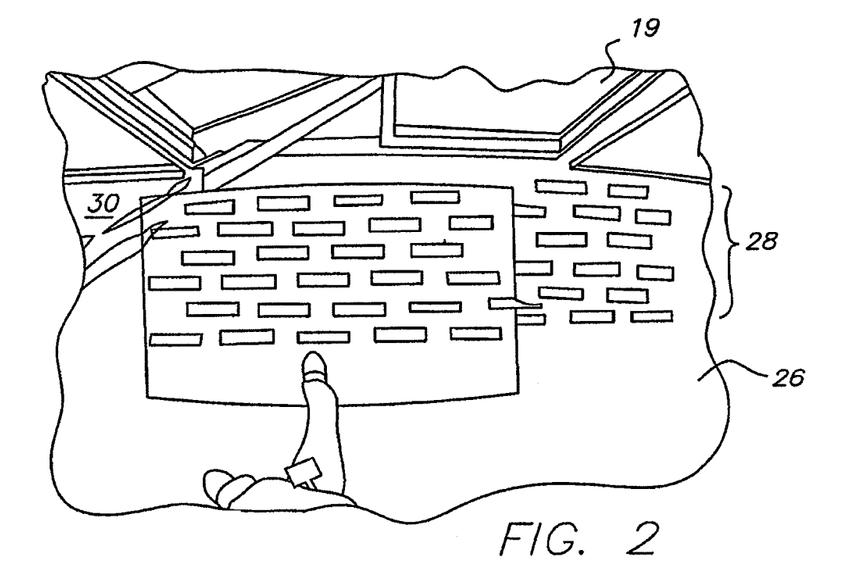
FIG. 2 is an illustration of an example of two-dimensional objects in the form of stickers present on the floor in FIG. 1B.

Camera 22 captures video images along an image plane 25 parallel to a floor 26. Two-dimensional objects or design are provided upon the floor, such objects or design may be provided by stickers, or a mat with pre-defined design pattern located along the image plane 25. In the example shown in FIG. 2, two-dimensional objects are provided by stickers 28 (or tape segments) arranges on the floor 26, adjacent an external windowed door 19, and in the view of camera 22. In this example, the location of the image plane near the door, dynamic (moving) light and shadow spots can occur, such as in area 30. The stickers 28 may be adhesive back media, such as paper or plastic, evenly or unevenly spaced along the image plane 25. When a mat is used, it lies along the image plane 25 and provides a design of a predefined pattern of two-dimensional objects of the same or different geometric shapes, a design having spaced two-dimensional features, or a company's logo, or a combination thereof. The particular two-dimensional objects or design used is not critical so long as they provide two-dimensional shapes or design features spaced along the image plane, such as described below. Optionally, the floor itself, such as a rug or tile, may be when installed embedded with spaced two-dimensional objects or design.

Figure 3:
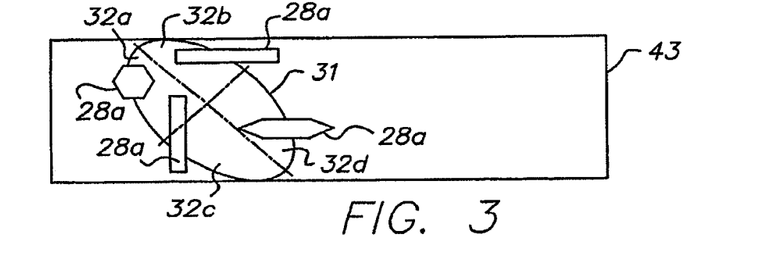
FIG. 3 is an example of how to distribute two-dimensional objects on the floor, such that a hypothetic person, defined by an ellipse, can cover completely or partially various two-dimensional objects in the image plane of the camera of FIG. 1B.

FIG. 3 is an example of how to distribute two-dimensional objects on the floor, such that a hypothetical person, defined by an ellipse 31, can cover completely or partially various two-dimensional objects 28a in the image plane of the camera 22. The two-dimensional objects or design features are illustrated as pre-defined shapes located on the floor below the camera, and are spread all over the effective region (described below) such that every ellipse 31 that can contain a passing person in the region must include at least 10 pixels of shape boundary segments in each one of ellipse's four quarters 32a, 32b, 32c and 32d (dotted lines represent quarter lines).

Figure 4:
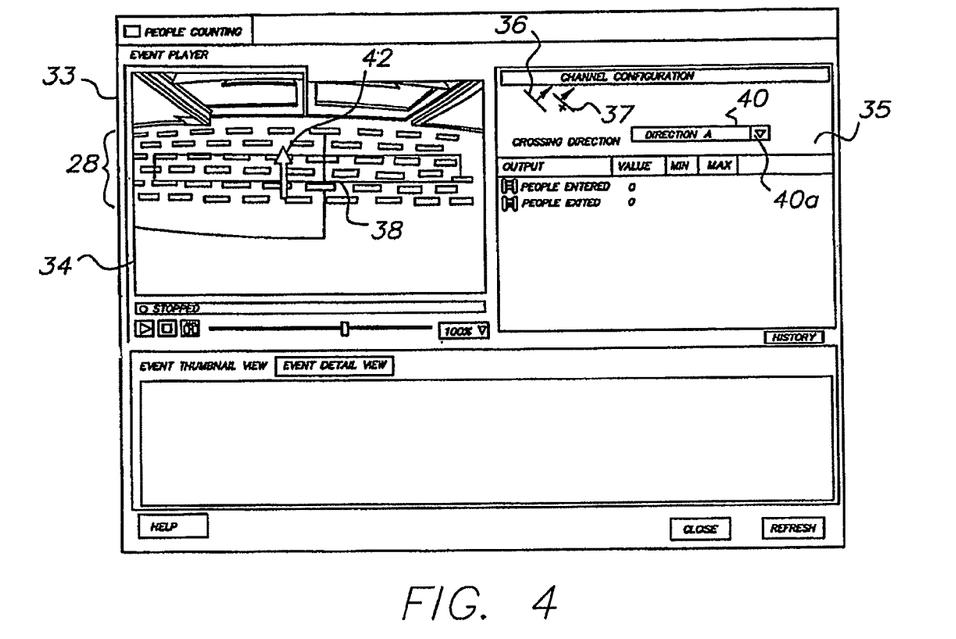
FIG. 4 is an example of a user interface for inputting user parameters for counting in accordance the present invention.
Figure 5:
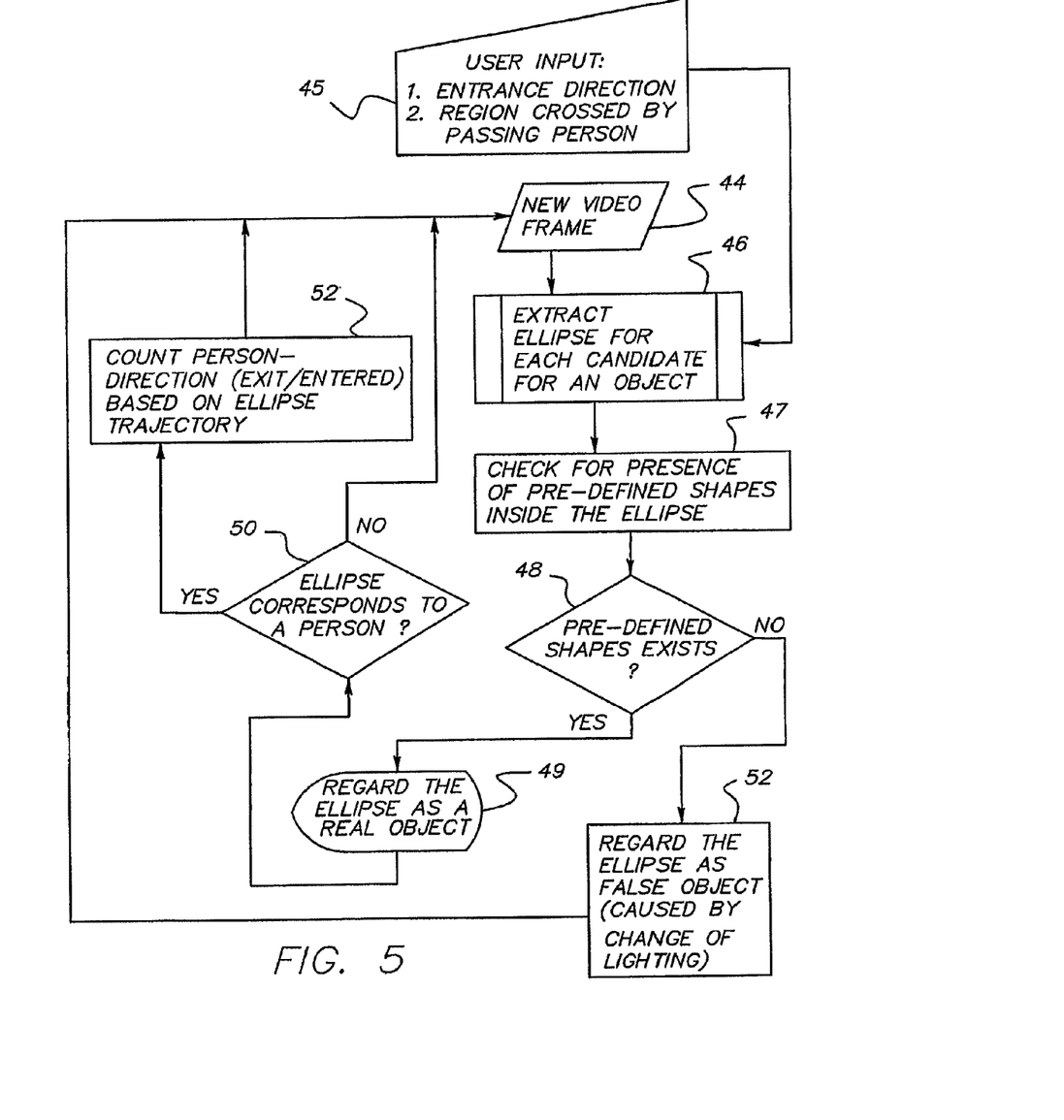
FIG. 5 is a flow chart showing the process carried out in software in the computer system for enabling counting in accordance with the present invention.

FIG. 5 is a flowchart of the process carried out by the software (program or application) in one of computers 14 and 20 of FIG. 1A for counting people in accordance with images received from camera 22. This computer has a typical graphical user interface, such as a display, mouse and keyboard, or the like. An example of the user interface 33 is shown in FIG. 4. The user interface 33 has a window 34 for displaying images provided in real-time by camera 22, and enables the user to input two parameters. These parameters (i) a narrow rectangular region through which a person will cross in the image, and (ii) the entrance direction of persons to be counted.

To enable entry of a narrow rectangular region, the user move the curser (by movement of the mouse) over an icon 36, clicks on the icon (using one of the mouse buttons), and then moves the curser over the image in window 34 to place two points to define two opposing corners (or vertices) along different sides of a region. The region 38 selected is shown such as in a color overlay in the images in window 34. Preferably, the region extends along the length of the possible area people will cross before (or after) passing through the door. To remove the region selected, the user may click on icon 37, and then clicks on icon 36 to reenter the region.

Figure 4A:
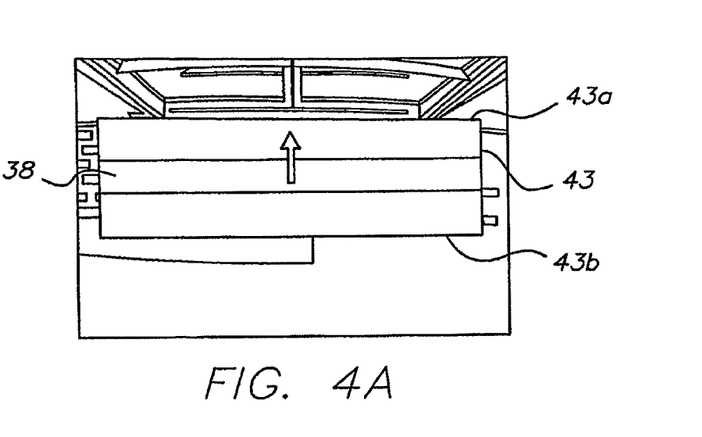
FIG. 4A is an illustration of the effective region established based upon the region inputted by the user using the user interface of FIG. 4.

The entrance direction is defined by selecting one of two options in field 40 with respect to the region, and such direction is perpendicular to the width of the rectangular region. The field 40 is changeable by the user clicking on the arrow 40a to toggle the entry or select an entry from a drop down menu. In the example, Direction A is shown selected and then indicated in window 34 by an arrow 42 (also shown as an overlap in the image in window 34). The user to select the opposite direction enters or selects Direction B in field 40. The width of the rectangular region is scaled by a pre-defined factor by the computer its memory, as illustrated in FIG. 4A. The scaled rectangle is referred to herein as the effective region 43.

Figure 7:
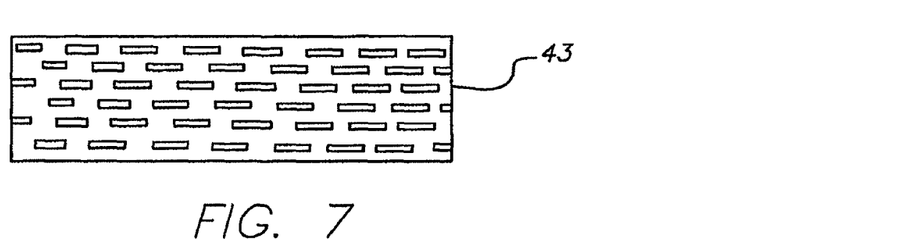
FIG. 7 is an example of a binary image showing the location of shapes of the two-dimensional objects or design feature in the case of the stickers of FIG. 2.

Once the parameters are set for the entry direction and effective region, the computer operates first in a learning mode to identify the location of pixels of boundaries of the two-dimensional objects or design in the effective region 43 of one or more images from camera 22. This is achieved by the computer taking a frame of a gray-scale image, thresh-olding the image to provide a binary image and extracting contours of connected components. Extraction contours of connected components is described for example in the Section "Contour Following" at page 358 of Anil K. Jain, "Fundamentals of Digital Image Processing, Prentice Hall Information and System Sciences Series, 1998, but other methods may be used, such as extracting line segments associated with connected objects. This occurs while there are no lights and shadows spots on the floor below the camera in the region of interest, and no people are crossing the region. The computer learns automatically all the shapes in a short period of time. Once the location of the shapes of two-dimensional objects or features of the two-dimensional design are known, their pixels are stored in a shape image in memory of the computer. An example of the shape image is shown in FIG. 7 for stickers 28 of FIG. 2 in the effective region 43 (FIG. 4).

Figure 6A:
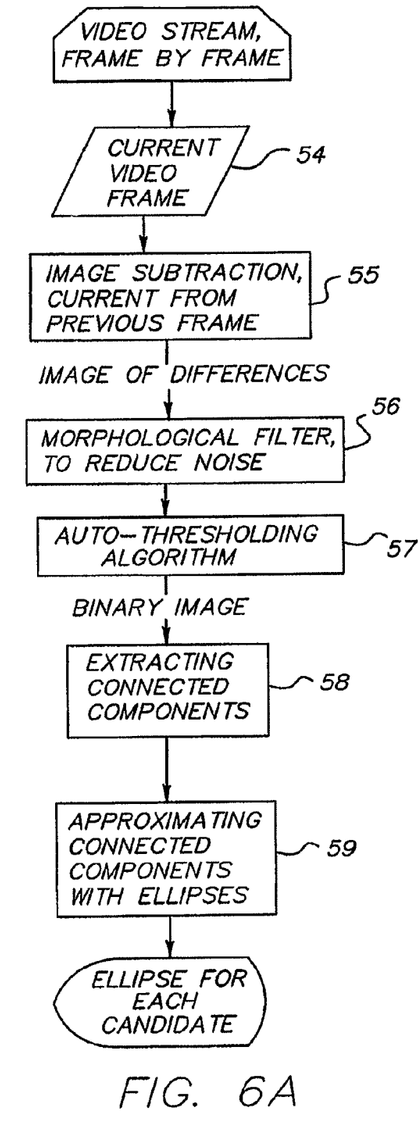
FIG. 6A is a flow chart showing one process for extraction of ellipses in the block of FIG. 5A entitled "Extract Ellipse for Each Candidate for an Object Detect Motion/Object"

Referring now of FIG. 5, each new video frames from the camera 22 (step 44) is processed to extract ellipse(s) for each candidate for an object (step 46) using the input (step 45). The process of step 46 is shown in FIG. 6A where the new video frame of step 44 represents the current video frame (step 54). Memory, such as RAM, in the computer stores at least the current video frame and the last received video frame of images from camera 22. First, for each two consecutive video frames image subtraction is performed to obtain gray-level image of differences ID (step 55). Optionally, one or more filter or filters are applied to the differences image $I_D$ to reduce noise, such as a morphological filter or digital convolution filter(s) (step 56). For example, an "opening" morphological filter may be used having a square opening, such as described for example in the book by Gonzalez, Rafael C. and Woods, Richard E., Digital Image Processing, Addison-Wesley Publishing Co., Massachusetts, Chapter 8.4.2, Page 518, 1993. After such image processing, the gray-level image $I_D$ is transformed into a binary (black or white only) image using auto-thresholding (e.g., setting a threshold value based on the distribution of gray-values and/or gradient magnitudes in differences image $I_D$, and applying it to every pixel in the differences image) (step 57). In other words, the threshold value applied to binarize image $I_D$ is automatically selected to identify areas of change in the image, while removing low differences values less likely to be associated with a moving object. Less preferably, a predefined fixed threshold value may be applied to each image ID. White pixels in the binary image stand for pixels with gray-level value higher than the threshold, and they stand for "pixels with change".

Connected components are then extracted from the binary image (step 58). Connected components refer to adjacent white pixels in the image appears as a shape, which if a person is expected to approximate an ellipse. The extraction of connected components may be performed as described for example in the earlier cited book by Gonzalez et al., Digital Image Processing, chapter 2.4, page 40, 1993. Once extracted, each connected component in the binary image is regarded as a possible person, and is approximated into an ellipse shape (step 59). An example of two connected components before and after approximation of their pixels to ellipses in shown in FIGS. 8A and 8B, respectively, for connected components 60a and 60b, and their approximated ellipses 61 and 61b, respectively.

Figure 8A:
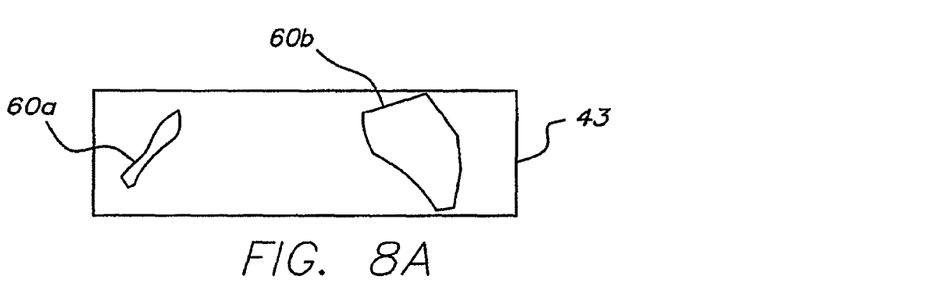
FIGS. 8A and 8B are examples of a binary image showing two objects detected, and then approximated in the shape of an ellipse, respectively.
Figure 8B:
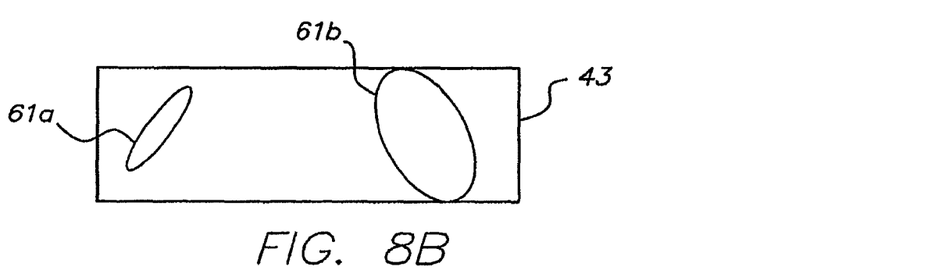

Using the set of pixels defining each detected object (i.e., a connected component), its elliptical center and two lengths and angular orientation of two orthogonal axes of the ellipse through that center are determined to identify the outer pixels defining the approximated ellipse shape. For example, this may be performed by determining the "moments of order 2" for all of the pixels within a connected component (i.e., average of the x values of pixels, the average of the y value or pixels, the average the multiplication of x and y values of each pixel, and the average of $x^2$ value of each pixel, the average of $y^2$ value of each pixel). For the moments of order 2 determined, a co variance matrix is built to locate the center of the ellipse, the length of the two main axes, and orientation which is an angle. The approximation of an ellipse should not be limited to any particular method, as any method for approximating an ellipse from a set of pixels may be used.

Figure 6B:
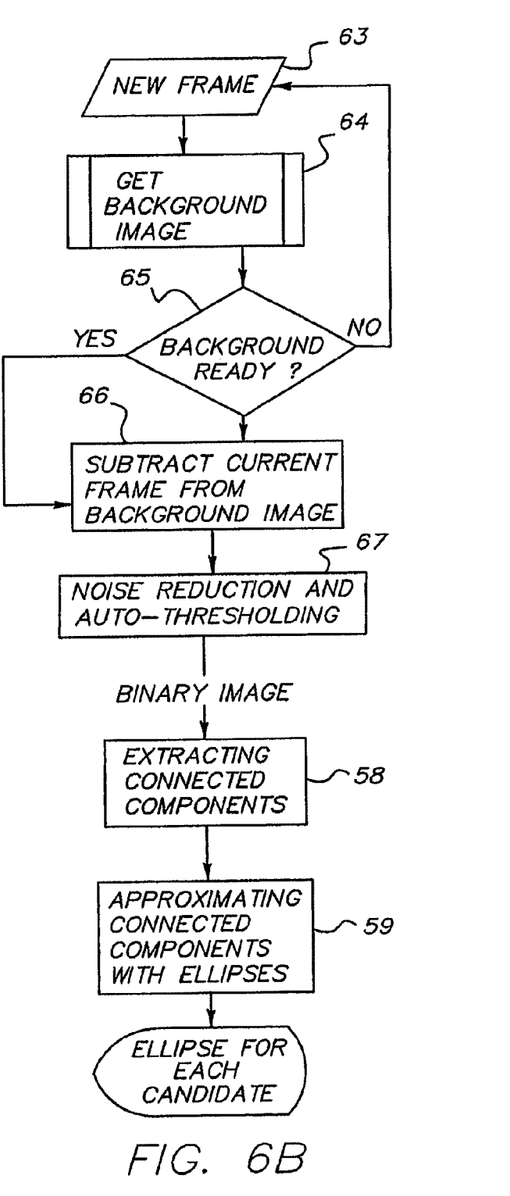
FIG. 6B is a flow chart showing another process for extraction of ellipses in the block of FIG. 5A entitled "Extract Ellipse for Each Candidate for an Object Detect Motion/Object"
Figure 6C:
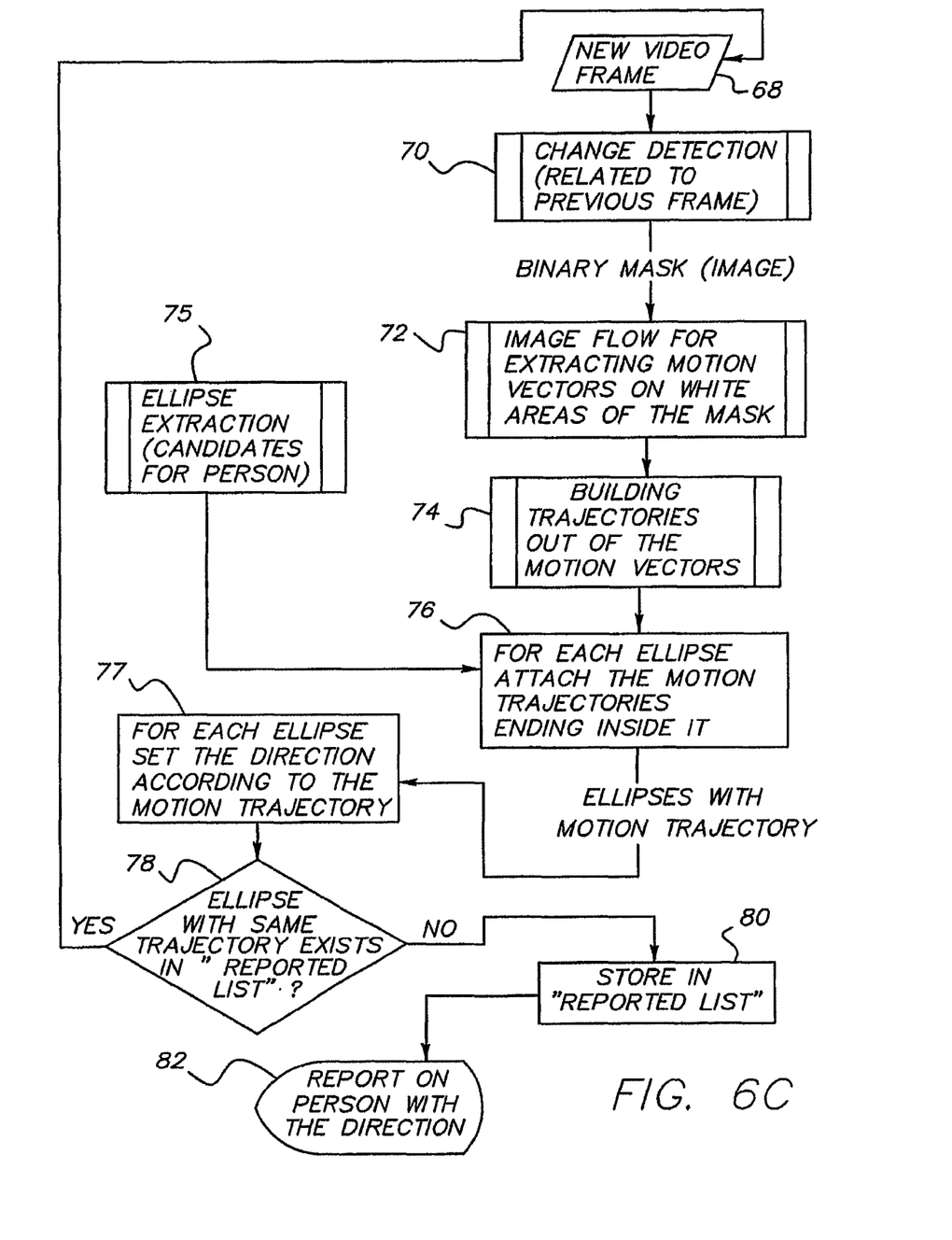
FIG. 6C is a flow chart for process of determining the trajectory of ellipse representing detected object.

Each candidate ellipse is stored in a Reported List maintained in memory of the computer, in which for each ellipse is an entry (or record) including data fields for at least (i) the image frame in which the object was detected (e.g., by time stamp and/or file name), (ii) ellipse data representing the ellipse associated with the detected object (e.g., defining by pixel locations, or the center, axes, and angular orientation of the ellipse in the frame), and (iii) direction data as to the object's direction (exit/entry) identified as described below in connection with FIG. 6C. Other data structures may also be used to store the same data as the Reported List.

Referring back to FIG. 5, after step 46 a check is made for the presence of the predefined pattern of objects of design feature shapes inside the boundaries of each of the ellipses (step 47). This is performed by comparing the location of the boundaries of an ellipse in the earlier determined shape image with those actually imaged by the camera when the object associated with the approximated ellipse was detected. If all, or a substantial number or percentage, of the pixels of the shapes are present in the ellipse (e.g., 75% or more), no real object is detected (e.g., a blob of light) (step 52). Otherwise, the object associated with the ellipse is considered to have fully or substantially occluded (i.e., blocked) such shapes, and the ellipse is a real object (step 49). The particular percentage used may be based on calibration using sample images of people crossing the floor below camera 22.

In other words, the image of the frame from step 44 is analyzed by thresholding the gradient magnitude of the pixels, such as by determining the gradient orientation, to provide a binary image of edge pixels (and/or with the angle of the tangents), and then by comparing the binary image with the shape image with regards whether such pixels in the shape image are present or not (e.g., by the percentage of pixels matching in such images) within the ellipse boundaries associated with a detected object.

If a real object is detected at step 49, a check is made to determine if the real object is a person (step 50). This may be based on one or both characteristics of the size and compactness of the ellipse, or other shape properties. For example, an ellipse is a person if the size of the ellipse is such that its boundaries touch both the top and bottom sides of the effective region 43 (or extend beyond one or both of these sides), and the compactness of the ellipse is such that the white pixels of the ellipse (within its boundaries in the binary image used by steps 58-59) cover at least 75% of the area of the ellipse and at least 50% of each ellipse quarter. Other criteria may be used, and the percentage can be calibrated when test subjects pass through the region. When the effective region 43 was established, as shown for example in FIG. 4A, it represents an extension of the top and bottom boundaries of the user selected region to the effective region's top and bottom boundaries 43a and 43b, respectively, which enable such ellipse size criteria to be effective at step 50. In other words, the ellipse is big enough to contain a person (passing under camera 22).

Figure 8C:
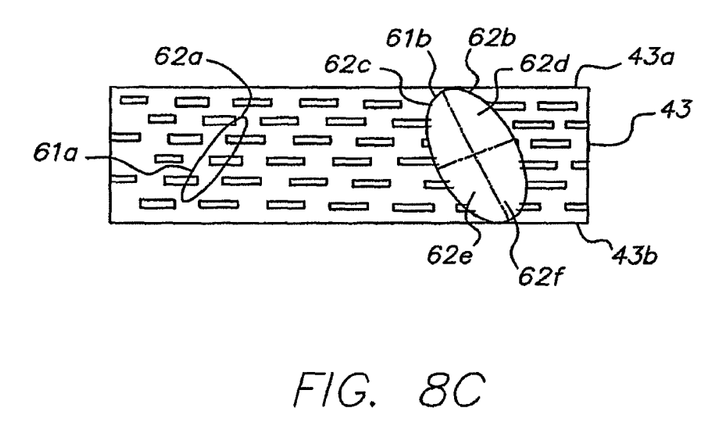
FIG. 8C is an example of a binary image showing blocked and unblocked portions of the dimensional objects or design features of FIG. 2 in the example of the two objects of FIGS. 8A and 8B.

In the example of FIGS. 8A and 8B$_5$ such binary image is shown for example in FIG. 8C, where approximated ellipse shape 61a of detected object 60a does not block view in area 62a, and approximated ellipse shape 61b of detected object 60b substantially blocks view in area 62b associated with the location of the object, and hence ellipse shape 61a is not a real object while shape 61b is a real object. For purposes of illustration, shapes 61 and 61b are shown outlined in FIG. 8C. Further the ellipse shape 61b is a person since its boundaries touch both the top and bottom boundaries 43a and 43b, respectively, of the effective region 43, and is sufficiently compact in that other 75% are white pixels, and at least 50% of each quarter 62c, d, e, f of the ellipse are white pixels.

If the ellipse is determined to be a person at step 50, the trajectory of the ellipse for the object is looked up in a Reported List to determine for that video frame of step 44 the direction of crossing the region. The direction of real object having been added to the Reported List as described below in FIG. 6C. Two counters are provided in memory of the computer one for each direction. In window 35 of the user interface (FIG. 4), each person that passes in the direction of arrow 42 (i.e., the crossing direction) is regarded as entered and each person that passes in the opposite directed is regarded as exited. The counter in accordance with the direction is indexed by one. The current count values of people entered and people exited is displayed to the user in window 34. The user interface may further have a button which when clicked upon by the user enables the counter values to be reset, if desired.

In the alternative to steps 55-57 of FIG. 6A, steps 64-67 of FIG. 6B may be used. Unlike FIG. 6A which relies on detection of change (i.e. motion) between two consecutive frames from camera 22, FIG. 6B uses detection of change between the current frame to a background image. The new video frame of step 44 is the new video frame (step 63), and a background image is read from memory of the computer or generated if one is not previously stored (step 64). Such background image is generated of the effective region 43 preferably when no motion of objects or spurious light is present using a number of consecutives frame (e.g., 10-20). For example, the gray-scale values at each pixel position over multiple consecutive frames are averaged or otherwise normalized to provide a background image, which is then stored in memory of the computer. If the background image is not already stored, the user is directed via the user interface to avoid motion along the region in view of the camera until such background image is generated. When the background image is ready (step 65), the current frame from step 62 is subtracted from the background image to provide a differences image (step 66). One or more filter or filters are then applied to the differences image to reduce noise in the image, such as a morphological filter or digital convolution filter(s), such as described earlier at step 56, and the differences image is then auto-thresholded, such as described earlier at step 57, to provide a binary image (step 67). The binary image from step 67 is then operated upon in the same manner as steps 58 and 59.

In order to determine direction of movement of a person, such that when the object represents a detected person crossing the effective region, it is counted in the proper direction of entry or exit, the process shown in the flowchart of FIG. 6C is performed. Each new video frame (step 68) from the camera is subtracted from the previous frame from the camera, and the resulting differences image is autothresholded (such as described earlier in connection with step 57) to produce a binary image, referred to herein as a binary mask (step 70). If needed to reduce noise, a morphological filter is applied to the binary mask. The white (1) pixels in the binary mask indicate change. Using the binary mask, image flow is detected by extracting motion vectors on the white pixel areas of the mask (step 72), such as based on Kanade-Lucas Tracker method.

For more information see article by Jean-Yves Bouguet, "Pyramidal Implemental of the Lucas Kanade Feature Tracker, Description of the algorithm", Intel Corp, Microprocessor Research Labs. From the motion vectors, trajectories are generated. The position of ellipses in the current image frame for each candidate are provided from the results of step 46 (FIG. 6A or 6B), and may be looked up by the computer in the Reported List for the current image frame (step 75). For each candidate ellipse from step 75, motion trajectories are attached which end inside it (step 76). For each ellipse, its direction is then set, either entry or exit, according to the Motion Trajectory, i.e., a direction toward the top boundary or bottom boundary of the effective region 43 (step 77). In the example of FIG. 4A, if the trajectory of the object represented by the ellipse was toward side 43a (i.e., in the direction of arrow 42) the object has entered, and if toward side 43b (the opposite direction to arrow 42), the object has exited. For each ellipse with a determined direction, if entry in the Reported List associated with that ellipse has direction data with no direction or an incorrect direction (step 78), the entry is updated with the direction for ellipse determined by step 77 (step 80). If an entry in the Reported List associated with an ellipse has direction data with the same direction as determined from step 77, then the Reported List is not updated. Step 82 reports on the person with direction, as denoted by step 52 of FIG. 5.

When a mat of the two-dimensional objects or design is used, movement of the mat may negatively affect performance, since the pattern of objects or design features used (as recorded in the shape image) to detect persons will have shifted. To account for this, the computer detects automatically a global movement of the mat by global correlation of the whole set of extracted features (the curve segments). This can be done periodically, such as every x number frames (e.g., x=10). For example, steps 64, 65 and 58 of FIG. 6B may be performed when no persons are present, and compared with the shape image mapping pixels of the objects or design features stored in memory, and the results compared. When a mismatch is detected, there are 3 options: an alarm is generated, the translation and rotation of the mat is automatically detected and the system re-adjusts itself to the new position of the mat, the system optionally restarts learning mode in order to re-learn the new location of two-dimensional objects or design of the mat and updates the shape image accordingly.

Optionally, the digital video recorder 16 or 16a could represent a stand-alone computer coupled to one or more video cameras with the ability to record and process real-time images capability. The user interface 33 and processes of FIGS. 5, and 6A or 6B are carried out by the stand-alone computer in response to image data received to counting objects representing people. Although preferred, other geometric shapes may be used in approximating connected object than ellipses described above. Further, although the above is described for detecting objects representing people, it may be used to detect passing other objects of different shapes by approximating connected components to other shapes. The desired shape of such objects to be discriminated among other objects may be identified during calibration of the system on test objects to be counted and not counted. Also, the same video images from a video camera may be used in multiple instances of the software described herein to detect different objects. Further, the user interface may also enable the user to set upper limit on the number of people, and when such limit is reached issues an alarm to notify personnel.

Although the system and method is described for counting in an area near an external windowed door, it may also be used for counting in other areas that need not be adjacent to such a door. As such, the use of two-dimensional shapes or design 28 in detecting objects to be counted in video images can provide efficient counting in situations with and without the possibility of dynamic reflected light in video images from moving or reflective door surfaces.

From the foregoing description, it will be apparent that there has been provided an improved system, method, and user interface for counting objects, such as people, in video images. Variations and modifications in the herein described system, method, and user interface in accordance with the invention will undoubtedly suggest themselves to those skilled in the art. Accordingly, the foregoing description should be taken as illustrative and not in a limiting sense.

The invention claimed is:

1. A user interface for counting objects in images captured by a video camera comprising:
    at least one display capable of displaying video image data captured by the camera;
    a user interface configured to enable a user to define a region along which objects are to be counted, said region including a surface having spaced two-dimensional shapes or design, an object being counted if the object substantially blocks a portion of the spaced two-dimensional shapes or design as the object crosses between the surface and the video camera; and
    at least one display capable of displaying a number of the counted objects crossing the region.

2. The user interface according to claim 1, wherein the user interface is configured to enable the user to set a direction objects that cross said region move for the objects to be counted.

3. The user interface according to claim 1, wherein said objects are people.

4. A system for counting objects crossing an area, comprising:
    a camera configured to capture images along a surface that is in the area, the surface includes a plurality of detectable features on the surface, wherein the objects to be counted cross between said surface and said camera;
    a user interface configured to allow a user to define a region in which object detection is desired, the region including the surface; and
    a processor configured to
        process said captured images,
        detect objects associated with change occurring in the region in said images, and
        count one of said detected objects at least in accordance with said one of said detected objects having a shape that indicates the detected object is to be counted if the one of said detected objects at least substantially blocks a portion of said plurality of detectable features in the region in one of said images associated with the detected object.

5. The system of claim 4, wherein
    the user interface is configured to allow the user to define a direction of movement of a detected object to be counted; and
    the processor considers a direction of movement of a detected object as part of a decision whether to count the detected object.

6. The system of claim 4, wherein the objects comprise people.

7. A user interface for facilitating an analysis of images captured by a camera configured to capture images along a surface that includes a plurality of detectable features on the surface, comprising a user input device that is configured to allow a user to define a region wherein objects may cross between said surface and said camera; and an output device that is configured to provide information regarding at least one object in at least one of the images that is a counted detected object having a shape that indicates the detected object is to be counted if the one of said detected objects at least substantially blocks a portion of said plurality of detectable features in the region in one of said images associated with the detected object.

8. The user interface of claim 7, wherein the user interface is configured to allow the user to define a direction of movement of a detected object to be counted.

9. The user interface of claim 7, wherein the objects comprise people.

* * * * *